United States Patent [19]
Yui et al.

[11] Patent Number: 5,948,155
[45] Date of Patent: Sep. 7, 1999

[54] INK-JET RECORDING INK AND RECORDING METHOD USING THE SAME

[75] Inventors: Toshitake Yui; Atsushi Suzuki; Nobuyuki Ichizawa; Kunichi Yamashita; Ken Hashimoto, all of Minami ashigara, Japan

[73] Assignee: Fuji Xerox Co., Ltd., Tokyo, Japan

[21] Appl. No.: 08/988,007

[22] Filed: Dec. 10, 1997

[30] Foreign Application Priority Data

Dec. 12, 1996 [JP] Japan .................................. 8-331699

[51] Int. Cl.$^6$ .................................................. C09D 11/02
[52] U.S. Cl. ..................................... 106/31.58; 106/31.86
[58] Field of Search ........................... 106/31.58, 31.86

[56] References Cited

U.S. PATENT DOCUMENTS

| | | | |
|---|---|---|---|
| 4,508,570 | 4/1985 | Fujii et al. ............................ | 106/31.58 |
| 4,986,850 | 1/1991 | Iwata et al. ........................... | 106/31.58 |
| 5,085,698 | 2/1992 | Ma et al. ............................... | 106/31.6 |
| 5,141,556 | 8/1992 | Matrick ................................ | 106/31.58 |
| 5,172,133 | 12/1992 | Suga et al. ............................ | 106/31.6 |
| 5,180,425 | 1/1993 | Matrick et al. ....................... | 106/31.58 |
| 5,221,334 | 6/1993 | Ma et al. ............................... | 106/31.6 |
| 5,254,158 | 10/1993 | Breton et al. ......................... | 106/31.58 |
| 5,281,262 | 1/1994 | Saito .................................... | 106/31.86 |
| 5,356,464 | 10/1994 | Hickman et al. ..................... | 106/31.58 |
| 5,486,550 | 1/1996 | Lubas .................................. | 106/31.46 |
| 5,656,071 | 8/1997 | Kappele et al. ....................... | 106/31.86 |
| 5,743,945 | 4/1998 | Yamashita et al. ................... | 106/31.58 |

FOREIGN PATENT DOCUMENTS 56-147871  11/1981  Japan .

*Primary Examiner*—Helene Klemanski
*Attorney, Agent, or Firm*—Oliff & Berridge, PLC

[57] ABSTRACT

Ink-jet recording ink and an ink-jet recording method, said ink-jet recording ink comprising a water-insoluble coloring material, water, and at least one compound selected from the group consisting of a compound represented by formula (I) and polyglycerin:

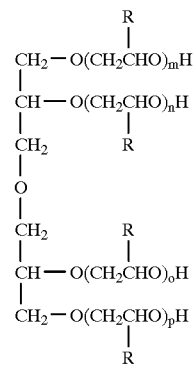

(I)

wherein R represents H or an alkyl group having 1 to 5 carbon atoms; m, n, o and p are all integers; and m+n+o+p is 0 to 200.

15 Claims, No Drawings

INK-JET RECORDING INK AND RECORDING METHOD USING THE SAME

FIELD OF THE INVENTION

The present invention relates to novel heat resisting ink-jet recording ink and an ink-jet recording method using the same.

BACKGROUND OF THE INVENTION

Printers of the so-called ink-jet system in which liquid or melted solid ink is discharged through nozzles, slits, porous films or the like to make recordings on materials to be recorded such as paper, cloth or film have various advantages of small size, low cost and silence in their operation. A number of ink-jet printers are therefore commercially available as black monochromatic printers and full color printers. The piezo ink-jet system using piezoelectric elements and the thermal ink-jet system in which ink droplets are formed by the action of thermal energy to make recordings are particularly useful among others in that high-speed printing is possible and high resolution is obtained.

In general, various characteristics are required for the ink-jet recording ink, and it is said that the following matters are particularly important.

(1) Good image quality having no image defect and no image unevenness even when ink is used for a long period of time.

(2) In the thermal ink-jet method, burning (kogation) due to changes in temperature does not occur on a heater site in which air bubbles are formed and developed at high temperatures, and stable images are obtained over a long period of time.

(3) Long-term storage is possible.

(4) Images obtained are excellent in storage stability.

(5) Images obtained are rapidly dried, and excellent in fixing property.

In order to improve the above-mentioned matters, a number of inventions have previously been made with respect to ink-jet recording ink, and they have come in practice.

As the ink-jet recording ink, aqueous dye ink is mainly used. However, it has problems in terms of waterfastness and lightfastness, and it is not necessarily sufficient with regard to storage stability of image. On the other hand, ink in which pigments are used as coloring materials can improve the waterfastness and the lightfastness, and gives high image density and does not feathere, so that it has a very good prospect. In recent years, a large number of inventions of this type have been proposed and have come in practice. For example, JP-A-56-147871 (the term "JP-A" as used herein means an "unexamined published Japanese patent application") discloses a recording solution comprising an aqueous medium containing at least a pigment, a polymer dispersing agent and a nonionic surfactant, and U.S. Pat. Nos. 5,085,698 and 5,221,334 disclose the use of an AB or BAB type block copolymer as a dispersing agent for a pigment. Further, the use of a specific pigment, water-soluble resin and solvent in combination is described in U.S. Pat. No. 5,172,133.

However, particularly in the thermal ink-jet system, it has previously been difficult to keep the stability of ink for a long period of time, because heat is rapidly given to the ink in a printing head. That is, when the ink is rapidly heated, the dispersibility of a pigment contained therein becomes unstable to cause coagulation of pigment particles, resulting in development of large masses (aggregated masses) in the ink. Further, when this ink is used for a long period of time, there is the problem that not only the large masses thus developed bring about the kogation on a heater, but also an ink passage in a print head is clogged with the masses to block the flow of the ink. Furthermore, printing on paper by use of such ink not only prolongs the time required for drying, but also significantly deteriorates fixing on paper, because these large masses can not penetrate into paper fibers.

SUMMARY OF THE INVENTION

This invention was made to solve the above-mentioned technical problems in the conventional art.

An object of the present invention is to provide ink-jet recording ink having stable dispersibility even when heat is rapidly applied to the ink, giving good image quality having no image defect and no image unevenness in image formation using the same, fast dried in images on various kinds of transfer paper, good in fixing property and high in reliability.

Another object of the present invention is to provide an ink-jet recording method using the ink.

As a result of intensive studies on ink-jet recording ink containing water-insoluble coloring materials and water, the present inventors have discovered that ink-jet recording ink which is stable in dispersibility and can form images of good quality can be obtained by addition of specific polyhydric alcohol compounds, thus completing the present invention.

Namely, according to the present invention, there is provided ink-jet recording ink comprising a water-insoluble coloring material, water, and at least one compound selected from the group consisting of a compound represented by formula (I) and polyglycerin:

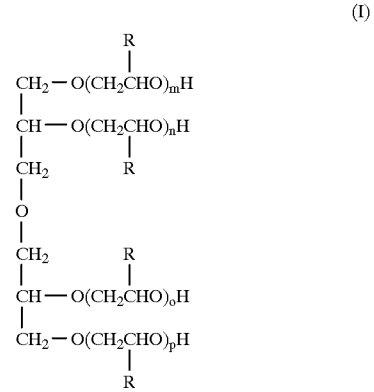

wherein R represents H or an alkyl group having 1 to 5 carbon atoms; m, n, o and p are all integers; and m+n+o+p is 0 to 200.

The present invention further provides an ink-jet recording method comprising discharging droplets of ink through an orifice of a recording head and making a recording on a material to be recorded, wherein said ink is ink comprising a water-insoluble coloring material, water, and at least one compound selected from the group consisting of a compound represented by the above-mentioned formula (I) and polyglycerin.

DETAILED DESCRIPTION OF THE INVENTION

Embodiments of the present invention are described in detail below.

The ink-jet recording ink of the present invention is characterized in that at least one compound selected from the group consisting of a compound represented by formula (I) and polyglycerin is mixed with a water-insoluble coloring material and water.

The compound represented by formula (I) used in the present invention has the following chemical structure:

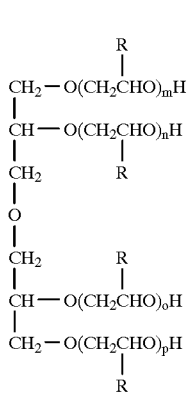

(I)

In the above-mentioned formula (I), R is selected from a hydrogen atom and alkyl groups each having 1 to 5 carbon atoms. Of the alkyl groups, methyl, ethyl and propyl groups having 1 to 3 carbon atoms are preferred. A compound having 6 or more carbon atoms is unfavorable because dissolution thereof in ink becomes difficult. Further, m, n, o and p are all integers indicating the repetition number of the structure unit represented by "$CH_2CHRO$". The total value of m, n, o and p is an integer ranging from 0 to 200, preferably from 0 to 150, more preferably from 1 to 130. A compound having a total value of more than 200 is unfavorable, because the viscosity of ink is extremely increased, resulting in the liability to cause clogging. Examples of the compounds represented by formula (I) include SC-E750, SC-E1000, SC-E1500, SC-E2000, SC-E2800, SC-E4500, SC-P400, SC-P750, SC-P1000, SC-P1300 and SC-P3500 (trade name, all are manufactured by Sakamoto Yakuhin Co. Ltd.).

Polyglycerin for use in the present invention preferably has a polymerization degree of 2 to 30 (a molecular weight of 166 to 250). In the present invention, either of the compound represented by formula (I) and polyglycerin is useful, but the compound represented by formula (I) is more effective.

The total amount of the above-mentioned compound represented by formula (I) and polyglycerin added to ink may be from 0.01% to 20% by weight, preferably from 0.05% to 15% by weight. These compounds may be used either alone or as a combination of two or more of them, and it is preferred that the total amount thereof is within the range described above. These compounds may be added in any process. For example, they may be added in a coloring material dispersing process, or together with other additives in preparing ink compositions.

As the water-insoluble coloring materials used in the present invention, pigments, oil-soluble dyes or colored polymers may be used, and pigments are suitable from their easy handling.

The pigments used in the present invention include but are not limited to inorganic pigments such as zinc white, titanium white, chromium oxide, iron oxide, alumina white, cadmium yellow, zinc sulfide, zinc chlomate, chrome yellow, barium sulfate, basic lead sulfate, calcium carbonate, white lead, ultramarine, calcium silicate, manganese violet, cobalt violet, Prussian blue and carbon black; organic pigments such as madder lake, cochineal lake, Naphthol Green B, Naphthol Green Y, Naphthol Yellow S, Permanent Red 4R, Hansa Yellow, Benzidine Yellow, Lithol Red, Lake Red C, Lake Red D, Brilliant Carmine 6B, Bordeaux 10B, Phthalocyanine Blue, Phthalocyanine Green, Sky Blue, Rhodamine Lake, Methyl Violet Lake, Quinoline Yellow Lake, Peacock Blue Lake, Thioindigo maroon, Alizaline Lake, Quinacridone Red, Perylene Red, Aniline Black, Dioxazine Violet, organic fluorescent dyes and Isoindoline Yellow; magnetic and superparamagnetic substances such as magnetites such as cobalt oxide, γ-iron oxide, metallic iron powder and barium ferrite, and ferrite; plastic pigments; and metal luster pigments. Any pigments can be selected to hues used. One or more kinds of known dyes may be further mixed with the above-mentioned pigments.

The pigments used as the coloring materials are exemplified by trade names or C.I. pigment numbers below, but are not limited thereto. Black pigments are carbon black pigments such as furnace black, lamp black, acetylene black and channel black. Examples thereof include but are not limited to Raven 7000, Raven 5750, Raven 5250, Raven 5000 ULTRA II, Raven 3500, Raven 2000, Raven 1500, Raven 1250, Raven 1200, Raven 1190 ULTRA II, Raven 1170, Raven 1255, Raven 1190 ULTRA, Raven 1080 ULTRA, Raven 790 ULTRA, Raven 780 ULTRA and Raven 780 ULTRA (manufactured by Columbian Co. Ltd.), Regal 400R, Regal 330R, Regal 660R, Mogul L, Monarch 700, Monarch 800, Monarch 880, Monarch 900, Monarch 1000, Monarch 1100, Monarch 1300, Monarch 1400, Black Parls L, Valcan XC-72 and Valcan XC-72R (manufactured by Cabot Co. Ltd.), Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A and Special Black 4 (Degussa Co. Ltd.), No. 25, No. 33, No. 40, No. 47, No. 52, No. 90, No. 2300, MCF-88, MA 600, MA 7, MA 8 and MA 100 (manufactured by Mitsubishi Chemical Corporation). Further, fine particles of magnetic substances such as magnetite and ferrite, or titanium black may be used as the black pigment.

Cyan pigments include but are not limited to C. I. Pigment Blue 1, C. I. Pigment Blue 2, C. I. Pigment Blue 3, C. I. Pigment Blue 15, C. I. Pigment Blue 15:1, C. I. Pigment Blue 15:3, C. I. Pigment Blue 15:34, C. I. Pigment Blue 16, C. I. Pigment Blue 22 and C. I. Pigment Blue 60. Further, magenta pigments include but are not limited to C. I. Pigment Red 5, C. I. Pigment Red 7, C. I. Pigment Red 12, C. I. Pigment Red 48, C. I. Pigment Red 48:1, C. I. Pigment Red 57, C. I. Pigment Red 112, C. I. Pigment Red 122, C. I. Pigment Red 123, C. I. Pigment Red 146, C. I. Pigment Red 168, C. I. Pigment Red 184 and C. I. Pigment Red 202.

Yellow pigments include but are not limited to C. I. Pigment Yellow 1, C. I. Pigment Yellow 2, C. I. Pigment Yellow 3, C. I. Pigment Yellow 12, C. I. Pigment Yellow 13, C. I. Pigment Yellow 14, C. I. Pigment Yellow 16, C. I. Pigment Yellow 17, C. I. Pigment Yellow 73, C. I. Pigment Yellow 74, C. I. Pigment Yellow 75, C. I. Pigment Yellow 83, C. I. Pigment Yellow 93, C. I. Pigment Yellow 95, C. I. Pigment Yellow 97, C. I. Pigment Yellow 98, C. I. Pigment Yellow 114, C. I. Pigment Yellow 128, C. I. Pigment Yellow 129, C. I. Pigment Yellow 151 and C. I. Pigment Yellow 154.

In addition to the black pigments and the three-primary color pigments of cyan, magenta and yellow, specific color pigments of red, green, blue, brown and white, metal luster pigments of golden and silver colors, colorless extender pigments and plastic pigments may be used.

Further, pigments of black, cyan, magenta, yellow, red, blue and green newly synthesized for use in the present invention may also be used. It is preferred that organic and inorganic impurities are removed from these pigments for preventing clogging and burning (kogation) on a heater in the thermal ink-jet system. In particular, it is desirable that the amounts of calcium, iron, silicon, magnesium, phosphorus and zinc contained in ink are each reduced to 5 ppm or less. These metals can be removed, for example, by washing with water, ultrafiltration membrane methods, ion exchange treatment or adsorption by active carbon or zeolite.

The pigments used can also be surface treated in advance. For example, surface treatment with alcohols such as ethanol and propanol, treatment with surfactants, treatment with pigment derivatives substituting acid groups or basic groups, pigment coating reaction treatment of coating pigment surfaces with other substances, surface chemical reaction treatment of introducing substituent groups by the condensation reaction or the graft reaction, coupling reaction treatment of conducting surface treatment with silane coupling agents, titanate coupling agents, zirconate coupling agents or aluminate coupling agents, plasma reaction treatment or CVD treatment can be applied. Examples of such treated pigments include Cabojet 300 and Cabojet 200 (trade names, manufactured by Cabot Co. Ltd.) and Microjet CW-1 (trade name, manufactured by Orient Kagaku Co. Ltd.).

The above-mentioned water-insoluble coloring materials for use in the present invention may have a primary particle size of 10 nm to 150 nm, preferably 15 nm to 120 nm, and a volume average particle size of 20 nm to 500 nm, preferably 30 nm to 400 nm, in ink. The volume average particle size in ink can be easily measured, for example, with UPA 9340 manufactured by Microtrac Co. According to this method, the measurement can be made without dilution of ink. However, the ink may be diluted if necessary. In the present invention, the viscosity value-of ink measured was used as it is. As to the primary particle size, the value measured by observation under an electron microscope was used.

In general, dispersing agents are used for dispersing the water-insoluble coloring materials in ink. As the dispersing agents used in the present invention, known surfactants or polymer dispersing agents are preferably used. As the polymer dispersing agents, it is effective to use polymers having hydrophilic structure moieties and hydrophobic structure moieties. The polymers having these two kinds of structure moieties include condensation polymers and addition polymers. As the polymer dispersing agents composed of these polymers, homopolymers of $\alpha,\beta$-ethylenic unsaturated monomers having hydrophilic groups or copolymers obtained by appropriately combining these monomers with $\alpha,\beta$-ethylenic unsaturated monomers having hydrophobic groups are used.

The $\alpha,\beta$-ethylenic unsaturated monomers having hydrophilic groups include monomers having carboxyl groups or sulfonic acid groups such as acrylic acid, methacrylic acid, crotonic acid, itaconic acid, itaconic acid monoesters, maleic acid, maleinsulfonic acid, sulfonated vinylnaphthalene and styrenesulfonic acid. On the other hand, the $\alpha,\beta$-ethylenic unsaturated monomers having hydrophobic groups include styrene derivatives such as styrene, $\alpha$-methylstyrene and vinyltoluene, alkyl acrylates, alkyl methacrylates, alkyl crotonates, alkyl itaconates, dialkyl itaconates and dialkyl maleates.

The copolymers preferably used as the dispersing agents include styrene-styrenesulfonic acid copolymers, styrene-maleic acid copolymers, styrene-methacrylic acid copolymers, styrene-acrylic acid copolymers, vinylnaphthalene-maleic acid copolymers, vinylnaphthalene-methacrylic acid copolymers, vinylnaphthalene-acrylic acid copolymers, alkyl acrylate-acrylic acid copolymers, alkyl methacrylate-methacrylic acid copolymers, styrene-alkyl methacrylate-methacrylic acid copolymers and styrene-alkyl acrylate-acrylic acid copolymers. It is preferred that the above-mentioned alkyl esters each has 1 to 6 carbon atoms. Monomers having polyoxyethylene groups or hydroxyl groups may be further appropriately copolymerized with these copolymers.

Further, monomers having cationic functional groups may be appropriately copolymerized for increasing the affinity for water-insoluble coloring material having acidic functional groups on their surfaces and improving the dispersion stability. Examples of such monomers include N,N-dimethylaminoethyl methacrylate, N,N-dimethylaminoethyl acrylate, N,N-dimethylaminomethacryl-amide, N,N-dimethylaminoacrylamide, vinylpyridine and vinylpyrrolidone. Furthermore, there can also be used polystyrenesulfonic acid, polyacrylic acid, polymethacrylic acid, polyvinylsulfonic acid, polyarginic acid, polyoxyethylene-polyoxypropylene copolymers, formalin condensation products of naphthalenesulfonic acid, cellulose derivatives such as carboxymethyl cellulose and carboxyethyl cellulose, polysaccharides and derivatives thereof, polyvinylpyrrolidone, polyethyleneimine, polyamines and polyamides.

Of these copolymers, polymers having acid groups as the hydrophilic groups are preferably used in the form of salts with basic compounds for increasing the water solubility. Examples of the compounds forming the salts with these copolymers include but are not limited to alkali metals such as sodium, potassium and lithium, and onium ions such as ammonium ions, organic ammonium ions, phosphonium ions, oxonium ions, stibonium ions, stannonium ions and iodonium ions. Dispersing agents which are generally commercially available can also be used. Examples thereof include Demol N and Demol Ep (manufactured by Kao Corp.) Nopcosant RFA and Nopcosant R (manufactured by Sunnopco Co.) and Solsperse 20000 (manufactured by Zeneca Co.). These copolymers may be any of random copolymers, block copolymers and graft copolymers.

Although the above-mentioned dispersing agents may have a low molecular weight, they have an average molecular weight ranging from 1000 to 10000, preferably from 2000 to 8000, and more preferably from 2500 to 7000. The amount of the dispersing agent added can not be specified indiscriminately, because it largely varies according to the water-insoluble coloring material used. However, it is usually within the range of 0.1% to 50% by weight, and preferably within the range of 1% to 40% by weight, in total based on the water-insoluble coloring material. However, carbon black particles whose surfaces are hydrophilized by surface treatment do not necessarily require the dispersing agent.

Further, for improving the dispersion stability of the water-insoluble coloring materials in ink, bases are preferably added. Examples of the bases used include potassium hydroxide, sodium hydroxide, lithium hydroxide, ammonium hydroxide, triethanolamine, diethanolamine, ethanolamine, 2-amino-2-methyl-1-propanol and ammonia. Further, it is also possible to use general pH buffers. The pH value of the ink is preferably within the range of 6.0 to 10.0, and more preferably within the range of 6.5 to 9.0.

Water-soluble organic solvents are preferably used in the ink-jet recording ink of the present invention. Specific examples of the water-soluble organic solvents include polyhydric alcohols such as ethylene glycol, diethylene glycol, propylene glycol, butylene glycol, triethylene glycol, 1,5-pentanediol, 1,2,6-hexanetriol and glycerin; polyhydric alcohol derivatives such as ethylene glycol monomethyl ether, ethylene glycol monoethyl ether, ethylene glycol-monobutyl ether, diethylene glycol monomethyl ether, diethylene glycol monoethyl ether, diethylene glycol monobutyl ether, propylene glycol monobutyl ether and dipropylene glycol monobutyl ether; nitrogen-containing solvents such as pyrrolidone, N-methyl-2-pyrrolidone, cyclohexylpyrrolidone and triethanolamine; alcohols such as ethanol, isopropyl alcohol, butyl alcohol and benzyl alcohol; sulfur-containing solvents such as thiodiethanol, thiodiglycerol, sulfolane and dimethyl sulfoxide; ethylene carbonate and propylene carbonate. Further, various surfactants can be used for controlling the surface tension of the ink. Nonionic and anionic surfactants slightly affecting the state of dispersion are preferably used among others. The nonionic surfactants include, for example, polyoxyethylene nonylphenyl ether, polyoxyethylene octylphenyl ether, polyoxyethylene dodecylphenyl ether, polyoxyethylene alkyl ethers, polyoxyethylene fatty acid esters, sorbitan fatty acid esters, polyoxyethylene sorbitan fatty acid esters, fatty acid alkylolamides, acetylene alcohol ethylene oxide adducts and polyethylene glycol/polypropylene glycol block copolymers. Examples of the anionic surfactants include alkylbenzenesulfonates, alkylphenylsulfonates, alkylnaphthalenesulfonates, higher fatty acid salts, sulfuric acid ester salts of higher fatty acid esters, sulfonates and higher alkyl sulfosuccinates. Further, betaines, sulfobetaines, sulfate betaines and imidazoline can be used as amphoteric surfactants. Besides, silicone surfactants such as polysiloxane polyoxyethylene adducts, fluorine-containing surfactants such as oxyethylene perfluoroalkyl ethers, and biosurfactants such as spiculisporic acid, rhamnolipids and lysolecithins can also be used.

The water-soluble organic solvents may be used in an amount of 3% to 50%, preferably 5% to 30%, based on the ink.

Further, as water, distilled water, so-called ultrapure water purified by use of an ion exchange resin, an ultrafiltration membrane or active carbon, or ion-exchanged water is preferably used.

In the prior-art ink, particularly in the ink containing polyhydric alcohol derivatives as the surfactants or the water-soluble organic solvents, it is known that the dispersion of the coloring materials becomes unstable by rapid heating to be likely to develop masses when the ink is used in the thermal ink-jet system. When the masses are developed in the ink, they gradually grow to larger masses (aggregated masses). The growth of the masses to a size at which the masses can not pass through a 5-$\mu$m filter causes various defects such as the occurrence of kogation and clogging, as described above. According to the present invention, however, the above-mentioned defects do not occur even in the ink containing the surfactants or the polyhydric alcohol derivatives, and therefore, the present invention is very effective.

Besides, polyethyleneimine, polyamines, polyvinylpyrrolidone, polyethylene glycol, cellulose derivatives such as ethyl cellulose and carboxyethyl cellulose, polysaccharides and derivatives thereof, water-soluble polymers, polymer emulsions, cyclodextrin, macrocyclic amines, dendrimer, crown ethers, urea and derivatives thereof and acetamide can be used in the ink-jet recording ink of the present invention for controlling the ink characteristics. It is also possible to add antioxidants, antifungal agents, viscosity regulating agents, conductive agents, antioxidants, ultraviolet absorbing agents or chelating agents as so required.

In the production of the ink of the present invention, for example, the ink can be obtained by adding a determined amount of a water-insoluble coloring material to an aqueous solution containing a determined amount of a dispersing agent, sufficiently stirring the resulting solution, then, dispersing the pigment with a dispersing device, removing large-sized particles by centrifugation, further adding a specified solvent and additives, followed by mixing with stirring, and filtering the resulting mixed solution. After mixing of water and the determined solvent, the dispersing agent may be added to the solution, followed by addition of the water-insoluble coloring material, which is dispersed by use of the dispersing device. As the dispersing device, a commercially available device can be used. Examples thereof include colloid mills, flow jet mills, slasher mills, high-speed dispersers, ball mills, attriters, sand mills, sand grinders, ultrafine mills, Eiger motor mills, Dyno mills, purl mills, agitator mills, co-ball mills, three-roll mills, two-roll mills, extruders, kneaders, micro fluidizers, ultimizers, laboratory homogenizers, ultrasonic homogenizers and accusizers. They may be used alone or in combination. In the ink-jet recording method using the above-mentioned ink of the present invention, recording heads are preferably formed of polyimide resins excellent in heat resistance. Specifically, the recording heads are preferably formed of HTR-3 7520 (trade name, manufactured by OCG Co.) or Photoneese (trade name, manufactured by Toray Industries Inc.).

The mechanism which stabilizes the dispersibility of the coloring material in the ink-jet recording ink of the present invention to produce no masses thereof even by rapid heating in the thermal ink-jet system is not necessarily apparent, but considered as follows. That is, the compound represented by formula (I) and polyglycerine are presumed to have the function of preventing separation of the dispersing agent easily eliminable from a surface of the coloring material by heat and allowing them to be adsorbed by the surface again by compensating rapid arrival of heat at the surface of the coloring material and the dispersing agent and microscopically, forming a high-viscosity layer around the dispersed coloring material at the same time by loose arrangement of carbon chains acting as hydrophobic groups in their chemical structures toward the coloring material around it.

The present invention will hereinafter be described with reference to examples in detail.

EXAMPLE 1

(Preparation of Dispersion A)

| | |
|---|---|
| Carbon Black (Raven 5250, primary particle size: 16 nm, manufactured by Columbian Co. Ltd.) | 10 parts by weight |
| Styrene-Potassium Maleate Anhydride Copolymer (molecular weight: 2,000, styrene/maleic anhydride = 1/2, acid value: 220) | 1.5 parts by weight |
| Ultrapure Water | 70 parts by weight |

The above-mentioned components were mixed and stirred for 30 minutes. Then, the mixture was dispersed in a co-ball mill (medium: zirconia 1 mm in size, filling rate: 60%), and coarse particles were removed from the resulting dispersion with a centrifuge. The resulting solution was named dispersion A.

(Production of Ink 1)

| | |
|---|---|
| Dispersion A | 50 parts by weight |
| Diethylene Glycol | 10 parts by weight |
| Isopropyl Alcohol | 2 parts by weight |
| Compound of Formula (A) | 5 parts by weight |
| (in the formula, R = H, | |
| m + n + o + P = 12) | |
| Nonionic Surfactant | 0.05 part by weight |
| (Surfynol 465, manufactured | |
| by Nissin Kagaku Co. Ltd.) | |
| Ultrapure Water | 31.95 parts by weight |

The above-mentioned components were mixed and stirred. Then, coarse particles were removed with a centrifuge again, and pressure filtration was further conducted by use of a 1-$\mu$m filter, thereby obtaining ink 1.

EXAMPLES 2 TO 9 AND COMPARATIVE EXAMPLES 1 AND 2

Dispersions B to H were prepared in the same manner as with dispersion A prepared in Example 1 with the exception that the components and the weight compositions shown in Table 1 were used.

Then, ink 2 of Example 2 to ink 9 of Example 9, ink 10 of Comparative Example 1 and ink 11 of Comparative Example 2 were obtained in the same manner as with ink 1 produced in Example 1 with the exception that the components and the weight compositions shown in Table 2 were used.

TABLE 1

| | Pigment | | Dispersing Agent | | | |
|---|---|---|---|---|---|---|
| Dispersion | Component | Parts by Weight | Component | Parts by Weight | Water | Parts by Weight |
| Dispersion A | Carbon Black (Raven 5250, primary particle size: 16 nm, manufactured by Columbian Co.) | 10 | Styrene/Potassium Maleate Anhydride Copolymer (average molecular weight: 2000, styrene/maleic acid = 1/2, acid value: 220) In dissolving, the pH was adjusted to 8.4 with KOH. | 1.5 | Ultrapure Water | 70 |
| Dispersion B | Carbon Black (Regal 330, primary particle size: 25 nm, manufactured by Cabot Co.) | 15 | Styrene/n-Butyl Methacrylate/ Ammonium Methacrylate Copolymer (average molecular weight: 3000, styrene/n-butyl methacrylate/ methacrylic acid = 1/2/2, acid value: 350) In dissolving, the pH was adjusted to 8.2 with KOH. | 2.0 | Ultrapure Water | 70 |
| Dispersion C | Carbon Black (Black Pearl L, primary particle size: 24 nm, manufactured by Cabot Co.) | 15 | Styrene/Sodium Styrenesulfonate Copolymer (average molecular weight: 3000, sulfonation degree: 90%) Styrene/Methoxytriethylene Glycol Methacrylate/Potassium Methacrylate Copolymer (average molecular weight: 2000, styrene/methoxytriethylene glycol methacrylate/methacrylic acid = 1/1/3, acid value = 300) In dissolving, the pH was adjusted to 8.5 with NH$_4$OH. | 0.5<br>3.0 | Ultrapure Water | 70 |
| Dispersion D | Carbon Black (No. 25B, primary particle size: 40 nm, manufactured by Mitsubishi Chemical Corp.) | 15 | Styrene/Sodium Styrenesulfonate Copolymer (average molecular weight: 6500, sulfonation degree: 90%) Styrene/Potassium Maleate Block Copolymer (average molecular weight: 2000, styrene/maleic acid = 1/2, acid value: 220) In dissolving, the pH was adjusted to 9.0 with NaOH. | 0.2<br>2.0 | Ultrapure Water | 70 |
| Dispersion E | Carbon Black (Regal 330, primary particle size: 25 nm, manufactured by Cabot Co.) | 15 | Styrene/Ammonium Methacrylate Copolymer (average molecular weight: 3500, styrene/maleic acid = 1/3, acid value = 320) In dissolving, the pH was adjusted to 8.5 with NH$_4$OH. | 3.0 | Ultrapure Water | 70 |
| Dispersion F | C.I. Pigment Blue 15:3 | 10 | n-Butyl Methacrylate/Lithium Methacrylate Copolymer (average molecular weight: 4500, n-butyl methacrylate/ | 4.0 | Ultrapure Water | 70 |

TABLE 1-continued

| | Pigment | | Dispersing Agent | | | |
|---|---|---|---|---|---|---|
| Dispersion | Component | Parts by Weight | Component | Parts by Weight | Water | Parts by Weight |
| Dispersion G | C.I. Pigment Red 122 | 15 | methacrylic acid = 1/3, acid value: 350) In dissolving, the pH was adjusted to 8.5 with LiOH. Styrene/Sodium Styrenesulfonate Copolymer (average molecular weight: 4000, sulfonation degree: 90%) | 3.0 | Ultrapure Water | 70 |
| Dispersion H | C.I. Pigment Yellow 83 | 15 | Styrene/n-Butyl Methacrylate/ Ammonium Methacrylate Copolymer (average molecular weight: 3700, styrene/n-butyl methacrylate/ methacrylic acid = 1/2/2, acid value: 300) In dissolving, the pH was adjusted to 8.2 with NaOH. | 2.0 | Ultrapure Water | 70 |

TABLE 2

| | Dispersion | | Solvent | | | |
|---|---|---|---|---|---|---|
| Ink | Kind | Parts by Weight | Component | Parts by Weight | Formula (1) | Parts by Weight |
| Example 1 | Dispersion A | 50 | Diethylene Glycol<br>Isopropyl Alcohol | 10<br>3 | $m + n + o + p = 12$<br>$R = H$ | 5 |
| Example 2 | Dispersion B | 55 | Glycerin<br>Thiodiethanol | 12<br>6 | $m + n + o + p = 17$<br>R: methyl | 7 |
| Example 3 | Dispersion C | 55 | Ethylene Glycol<br>Sulfolane | 15<br>10 | $m + n + o + p = 10$<br>R: ethyl | 4 |
| Example 4 | Dispersion C | 50 | Diethylene Glycol<br>Sulfolane | 10<br>6 | $m + n + o + p = 120$<br>$R = H$ | 2 |
| Example 5 | Dispersion D | 50 | 2-Pyrrolidone<br>Isopropyl Alcohol | 15<br>3 | $m + n + o + p = 25$<br>$R = H$<br>$m + n + o + p = 11$<br>R: methyl | 4<br><br>2 |
| Example 6 | Dispersion E | 25 | Diethylene Glycol<br>Diethylene Glycol Monobutyl Ether | 10<br>6 | $m + n + o + p = 12$<br>R: methyl | 10 |
| Example 7 | Dispersion F | 35 | Ethylene Glycol<br>Diethylene Glycol Monobutyl Ether | 15<br>9 | $m + n + o + p = 20$<br>R: propyl | 4 |
| Example 8 | Dispersion G | 45 | Ethylene Glycol<br>Sulfolane | 10<br>8 | $m + n + o + p = 10$<br>R=H | 4 |
| Example 9 | Dispersion H | 45 | Ethylene Glycol<br>Diethylene Glycol Monobutyl Ether | 10<br>7 | $m + n + o + p = 9$<br>R: methyl | 6 |
| Comparative Example 1 | Dispersion A | 50 | Diethylene Glycol<br>Isopropyl Alcohol | 10<br>3 | | |
| Comparative Example 2 | Dispersion B | 55 | Glycerin<br>Thiodiethanol | 10<br>6 | | |

| | When Added | | | |
|---|---|---|---|---|
| Ink | Component | Parts by Weight | Water | Parts by Weight |
| Example 1 | Surfynol 465 | 0.05 | Ultrapure Water | 31.95 |
| Example 2 | Polyoxyethylene Oleyl Ether<br>Urea | 0.1<br>5 | Ultrapure Water | 14.9 |
| Example 3 | Polysiloxane Polyoxyethylene Adduct<br>Styrene/Sodium Maleate Anhydride Copolymer<br>(average molecular weight: 1600, acid value: ca. 480) | 0.2<br>1 | Ultrapure Water | 15 |
| Example 4 | Fluorad FC-104<br>Urea<br>Cyclodextrin | 0.01<br>5<br>3 | Ultrapure Water | 19.99 |
| Example 5 | Urea<br>Ethyl Acrylate/Ethyl Methacrylate/Monoethanolamine Salt of Acrylic Acid | 5<br>3 | Ultrapure Water | 17.99 |

TABLE 2-continued

| | | | | |
|---|---|---|---|---|
| | Surfynol 465 | 0.01 | | |
| Example 6 | Pluronic 4300 | 0.5 | Ultrapure | 51.2 |
| | Sodium Benzoate | 0.3 | Water | |
| | Styrene/Butyl Acrylate/Acrylic Acid (average molecular weight: 10000, styrene/butyl acrylate/acrylic acid = 40/1/0.8, acid value: ca. 15) | 3 | | |
| Example 7 | Pluronic 6400 | 0.5 | Ultrapure | 35.5 |
| | Urea | 5 | Water | |
| | Styrene/Ammonium Maleate Anhydride Copolymer (average molecular weight: 1600, styrene/maleic anhydride 1/1:5, acid value: ca. 440) | 1 | | |
| Example 8 | Pluronic 4300 | 0.5 | Ultrapure | 29.2 |
| | Sodium Benzoate | 0.3 | Water | |
| | Styrene/Butyl Acrylate/ Acrylic Acid (average molecular weight: 10000, styrene/butyl acrylate/acrylic acid = 40/1/0.8, acid value: ca. 15) | 3 | | |
| Example 9 | Pluronic 6400 | 0.5 | Ultrapure | 26.5 |
| | Urea | 5 | Water | |
| Comparative Example 1 | Surfynol 465 | 0.05 | Ultrapure Water | 36.95 |
| Comparative Example 2 | Polyoxyethylene Oleyl Ether | 0.1 | Ultrapure | 18.9 |
| | Urea | 5 | Water | |
| | Liponic EG-1 | 5 | | |

In Table 2, "Surfynol 465" is a nonionic surfactant manufactured by Nissin Kagaku Co. Ltd., "Fluorad FC-104" is a fluorine surfactant manufactured by 3M Co., "Pluronic 4300" and "Pluronic 6400" are polymer surfactants manufactured by BASF AG, and "Liponic EG-1" is a viscosity enhancement agent manufactured by Lipochemical Co.

As to ink 1 to 11 obtained in Examples 1 to 9 and Comparative Examples 1 and 2 described above, the following tests were conducted to evaluate them.

(1) Dispersion Stability Test (1-a)

Ink was supplied to a prototype thermal ink-jet head (600 dpi, 100 nozzles), and injected. The ink discharged from nozzles was collected in a beaker. Then, 10 g thereof was passed through a 5-$\mu$m filter, and the time necessary for its passage was measured. The evaluation was conducted according to the following standard, compared with the initial ink.

○: The time necessary for passage was less than twice that of the initial ink, and within 5 minutes.

Δ: The time necessary for passage was less than 5 times that of the initial ink, and within 10 minutes.

x: The time necessary for passage was 10 minutes or more.

(1-b)

In a glass tube with a cap, 100 g of the prepared ink was enclosed. Then, an accelerated test of totally 6 cycles repeated was conducted, regarding standing in an atmosphere of 70° C. for 4 hours and standing in an atmosphere of −20° C. for 4 hours as one cycle. After the accelerated test, the ink was evaluated in the same manner as with (1-a).

(2) Image Quality Test

Using a prototype thermal ink-jet head (600 dpi), the image quality test was conducted. Using FX-L paper (A4 size, manufactured by Fuji Xerox Co., Ltd.), printing was continuously made on 200 sheets (coverage: about 10%) of the paper, and the presence or absence of image defects such as image defect were examined. The evaluation was conducted according to the following standard.

○: No defects were observed.

Δ: Defects were observed, but recovered by suction with a nozzle.

x: Defects were observed, and not recovered even by suction with a nozzle.

(3) Drying Time Test

Using FX-L paper (manufactured by Fuji Xerox Co., Ltd.) as plain paper, a solid image of 51 mm×10 mm was printed, and coat paper for ink jet (manufactured by Xerox Co.) was overlapped thereon. Then, pressure was applied onto it. The time until the ink came to be not transferred to the side of the coat paper for ink jet was taken as the drying time, and the evaluation was conducted according to the following standard.

○: Less than 30 seconds

Δ: 30 second to 60 seconds x: More than 60 seconds (4) Paper Fixing Test

Printing was made on FX-L paper (manufactured by Fuji Xerox Co., Ltd.), 4024 paper (manufactured by Xerox Co.) and an official postcard by use of the prototype used in (2), and they were allowed to stand for a day. Then, printed images were rubbed several times with a cotton swab, and the presence or absence of development of image stains was examined.

○: No stains were observed.

Δ: Some stains were observed around the images.

x: Image stains were significant, and it was impossible to make out letters.

(5) Kogation Test

The ink was continuously injected at $1 \times 10^8$ pulses per nozzle by use of a printer similar to that used in (2), and changes in dot diameter on FX-L paper (manufactured by Fuji Xerox Co., Ltd.) were examined. The evaluation was conducted according to the following standard.

○: Changes in dot diameter were less than 5% of those of the initial ink.

Δ: Changes in dot diameter were 5% to less than 10% of those of the initial ink.

x: Changes in dot diameter were 10% or more of those of the initial ink.

Results of the evaluation of ink obtained in the above-mentioned respective tests are shown in Table 3.

TABLE 3

| Ink | pH | (1) Dispersion stability Test (1-a) | (1-b) | (2) Image Quality Test | (3) Drying Time Test | (4) Fixing Property Test FX-L Paper | 4024 Paper | Post-card | (5) Kogation Test |
|---|---|---|---|---|---|---|---|---|---|
| Ink 1  | 7.8 | o | o | o | o | o | o | o | o |
| Ink 2  | 7.6 | o | o | o | o | o | o | o | o |
| Ink 3  | 8.3 | o | o | o | o | o | o | o | o |
| Ink 4  | 8.2 | o | o | o | o | o | o | o | o |
| Ink 5  | 8.0 | o | o | o | o | o | o | o | o |
| Ink 6  | 7.7 | o | o | o | o | o | o | o | o |
| Ink 7  | 8.8 | o | o | o | o | o | o | o | o |
| Ink 8  | 8.1 | o | o | o | o | o | o | o | o |
| Ink 9  | 8.0 | o | o | o | o | o | o | o | o |
| Ink 10 | 7.2 | x | x | x | x | x | Δ | x | x |
| Ink 11 | 8.1 | x | o | x | o | x | Δ | x | o |

According to the present invention, the jet recording ink can be obtained which has stable dispersibility even when heat is rapidly applied to the ink, gives good image quality having no image defect and no image unevenness in image formation using the same, is fast dried in images regardless of the kind of material to be recorded such as paper, is good in fixing property and is high in reliability.

What is claimed is:

1. An ink-jet recording ink comprising a water-insoluble coloring material, water and at least one compound selected from the group consisting of a compound represented by formula (I):

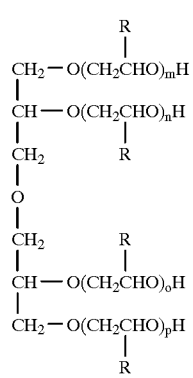

wherein R represents a hydrogen atom or an alkyl group having 1 to 5 carbon atoms; and m, n, o and p each represents an integer and the total of m, n, o and p is 0 to 200.

2. The ink-jet recording ink according to claim 1, wherein the compound represented by formula (I) is contained in an amount of 0.01% to 20% by weight based on the ink-jet recording ink.

3. The ink-jet recording ink according to claim 1, wherein the coloring material has a volume average particle size of 20 nm to 500 nm.

4. The ink-jet recording ink according to claim 3, wherein the coloring material is dispersed with a dispersing agent.

5. The ink-jet recording ink according to claim 4, wherein the dispersing agent is a polymer dispersing agent.

6. The ink-jet recording ink according to claim 4, wherein the dispersing agent is contained in an amount of 0.1% to 50% by weight based on the coloring material.

7. The ink-jet recording ink according to claim 1, further comprising a base.

8. The ink-jet recording ink according to claim 1, which has a pH ranging from 6.0 to 10.0.

9. The ink-jet recording ink according to claim 1, which contains a water-soluble organic solvent.

10. The ink-jet recording ink according to claim 1, which contains a surfactant.

11. The ink-jet recording ink according to claim 10, wherein the surfactant is a nonionic surfactant or an anionic surfactant.

12. An ink-jet recording method comprising discharging a droplet of an ink through an orifice of a recording head and making a recording on a material to be recorded, wherein the ink comprises a water-insoluble coloring material, water and at least one compound selected from the group consisting of a compound represented by formula (I) and polyglycerin:

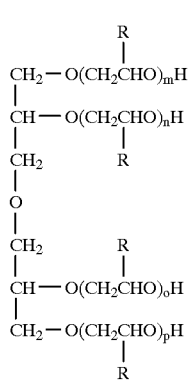

wherein R represents a hydrogen atom or an alkyl group having 1 to 5 carbon atoms; and m, n, o and p each represents an integer and the total of m, n, o and p is 0 to 200.

13. The ink-jet recording method according to claim 12, wherein the discharging of the ink is conducted by heating.

14. The ink-jet recording method according to claim 12, wherein the recording head comprises a polyimide resin.

15. The ink-jet recording method according to claim 12, wherein the compound represented by formula (I) is contained in an amount of 0.01% to 20% by weight based on the ink-jet recording ink.

* * * * *